United States Patent [19]

Manner et al.

[11] 4,062,715

[45] Dec. 13, 1977

[54] ADHESIVE COMPOSITION AND METHOD FOR BONDING POLYOLEFIN SURFACES WITH METAL SURFACES

[75] Inventors: Erich Manner; Klaus Adler; Engelbert Pichler; Johann Bauer, all of Burghausen; Hans Sommer, Munich, all of Germany

[73] Assignee: Wacker-Chemie GmbH, Munich, Germany

[21] Appl. No.: 678,957

[22] Filed: Apr. 21, 1976

Related U.S. Application Data

[63] Continuation-in-part of Ser. No. 386,515, Aug. 8, 1973, abandoned.

[30] Foreign Application Priority Data

Aug. 8, 1972 Germany .......................... 2239067

[51] Int. Cl.² ............................................... C09J 5/00
[52] U.S. Cl. .................................. 156/334; 156/309; 156/315; 260/29.7 WA; 260/897 B; 260/889; 260/901; 427/407 R; 427/407 E; 427/409; 428/462; 428/520; 428/463; 428/522; 428/517; 428/523
[58] Field of Search ............... 156/309, 332, 315, 334; 427/207 A, 407 R, 407 E, 409; 428/463, 522, 517, 523, 520, 462, 521; 260/29.6 RB, 29.7 UA, 887, 889, 897 B, 901, 29.7 WA; 526/331

[56] References Cited

U.S. PATENT DOCUMENTS

| | | | |
|---|---|---|---|
| 2,543,229 | 2/1951 | Chapman | 428/463 |
| 2,835,642 | 5/1958 | Safford et al. | 156/334 |
| 2,901,448 | 8/1959 | Kraus | 260/887 |
| 3,090,715 | 5/1963 | Clark et al. | 156/334 |
| 3,386,925 | 6/1968 | Dillhoefer | 260/889 |
| 3,553,051 | 1/1971 | Warrach et al. | 156/309 |
| 3,617,419 | 11/1971 | Fischer et al. | 156/334 |
| 3,622,440 | 11/1971 | Snedeker et al. | 156/334 |
| 3,644,258 | 2/1972 | Moore et al. | 260/29.7 UA |
| 3,708,388 | 1/1973 | Lindemann et al. | 428/520 |

*Primary Examiner*—Charles E. Van Horn
*Assistant Examiner*—J. J. Gallagher
*Attorney, Agent, or Firm*—Hammond & Littell

[57] ABSTRACT

An adhesion assistant or binder composition for bonding polyolefin surfaces with metal surfaces comprising an aqueous dispersion of an ethylene/vinyl acetate copolymer from 0.5 to 5 parts by weight based on 100 parts of the copolymer of a cross-linking peroxide compound and from 1 to 10 parts by weight based on 100 parts of the copolymer of a low-molecular-weight 1,2-polybutadiene; as well as a process for producing composite bodies by heat and pressure utilizing the above adhesion assistant between polyolefin surfaces and metal surfaces.

9 Claims, No Drawings

ADHESIVE COMPOSITION AND METHOD FOR BONDING POLYOLEFIN SURFACES WITH METAL SURFACES

REFERENCE TO A PRIOR APPLICATION

This application is a continuation-in-part of our co-pending application Ser. No. 386,515, filed Aug. 8, 1973, and now abandoned.

THE PRIOR ART

The permanent and firm bonding of polyethylene or other polyolefin products with each other or with other natural or synthetic materials is always a difficult problem. Due to the non-polar structure of the polyethylenes, most adhesives and adhesive mixtures show little affinity for them and therefore correspondingly poor adhesion. Some good results have been obtained with contact adhesive, bu these adhesives can only be processed in a narrow temperature range, and besides the binders of these adhesive systems become frequently brittle at low temperatures or soften at high temperatures, so that their bonding properties are lost. With reaction adhesives it is not possible to obtain any bond at all on untreated polyethylene surfaces.

Numerous methods have already been suggested to improve the poor affinity of the polyolefin surfaces for adhesives. For example, it is known to treat the surface by oxidizing substances, open flame, electric discharge distribution, corona discharge or radiation with gamma rays, so that a better adhesion of special adhesives or adhesive systems is achieved. These treatment methods are complicated and expensive, however.

Furthermore, it is known that peroxide-cross-linked polyethylenes show better adhesive properties. The production of these polyethylenes, however, requires additional process steps and besides crosslinked products are less resistant to aging.

It was also found that polyethylene bodies densely filled with carbon black or pyrogenic silica, for example, are capable of being bonded. However, the physicl properties, in particular, the ductility and the cold impact strength values, are reduced by the dense filling.

In practice, two methods for applying bonding coats onto polyethylene surfaces have been utilized. According to one method, a thin foil is produced from the adhesive compound in an extruder, and this foil is placed between the parts to be cemented. This method is cumbersome, however, and therefore not economical.

A second possibility consists in dissolving the adhesive in organic solvents and applying this adhesive solution. But this method has the disadvantage that the solvents are either lost or can only be recovered by using complicated measures. Besides it is practically impossible to completely remove the solvent from the dried adhesive layer, since a certain portion always remains as so-called solvent inclusions.

OBJECTS OF THE INVENTION

An object of the present invention therefore was to discover a method and adhesive system which would allow the bonding of untreated surfaces of a polyolefin with metal surfaces in a simple manner.

Another object of the present invention is the development of a method for bonding a metal surface to a polyolefin surface which comprises applying a layer of an adhesion assistant or binder composition consisting of an aqueous dispersion of an ethylene/vinyl acetate copolymer containing from 40 to 85 parts by weight of vinyl acetate and having a Mooney viscosity ML-4 of 8 to 40, from 0.5 to 5 parts by weight, based on 100 parts by weight of the copolymer, of a peroxide compound capable of crosslinking polymers, and from 1 to 10 parts by weight, based on 100 parts by weight of the copolymer, of a low-molecular-weight 1,2-polybutadiene having a molecular weight of from 500 to 10,000, to at least one of a polyolefin surface and a metal surface, allowing the aqueous dispersion to dry, placing said metal surface and said polyolefin surface in contact under pressure and an elevated temperature, and recovering a composite body of a metal surface bonded to a polyolefin surface.

A further object of the present invention is the development of an adhesion assistant or binder composition for use in the production of composite bodies of metal surfaces bonded to polyolefin surfaces consisting of an aqueous dispersion of an ethylene/vinyl acetate copolymer containing from 40 to 85 parts by weight of vinyl acetate and having a Mooney viscosity ML-4 of 8 to 40, from 0.5 to 5 parts by weight, based on 100 parts by weight of the copolymer, of a peroxide compound capable of crosslinking polymers and from 1 to 10 parts by weight, based on 100 parts by weight of the copolymer, of a low-molecular-weight 1,2-polybutadiene having a molecular weight of from 500 to 10,000.

These and other objects of the present invention will become more apparent as the description thereof proceeds.

DESCRIPTION OF THE INVENTION

The subject of the invention is a method for bonding polyolefin surfaces with metal surfaces by applying a polymeric adhesion assistant or binder composition characterized in that an aqueous dispersion of an ethylene/vinyl acetate copolymer with a content of 40% to 85% by weight of vinyl acetate and a Mooney viscosity ML-4 of 8 to 40 is used as an adhesion assistant or binder composition, which copolymer dispersion contains, in addition, a crosslinking peroxide compound capable of crosslinking polymers in amounts of 0.5 to 5 parts by weight, based on 100 parts by weight of the copolymer and a low-molecular-weight 1,2-polybutadiene with a molecular weight of 500 to 10,000, preferably 1,000 to 2,000, in amounts of 1 to 10 parts by weight, preferably 2 to 6 parts by weight, based on 100 parts by weight of the copolymer.

More particularly, the invention relates to a method for bonding a metal surface to a polyolefin surface which comprises applying a layer of an adhesion assistant or binder composition consisting of an aqueous dispersion of an ethylene/vinyl acetate copolymer containing from 40 to 85 parts by weight of vinylacetate and having a Mooney viscosity ML-4 of 8 to 40, from 0.5 to 5 parts by weight, based on 100 parts by weight of the copolymer, of a peroxide compound capable of crosslinking polymers and from 1 to 10 parts by weight, based on 100 parts by weight the copolymer, of a low-molecular-weight 1,2-polybutadiene having a molecular weight of from 500 to 10,000, to at least one of a polyolefin surface and a metal surface, allowing the aqueous dispersion to dry, placing said metal surface and said polyolefin surface in contact under pressure and an elevated temperature, and recovering a composite body of a metal surface bonded to a polyolefin surface; as well as an adhesion assistant or binder composition for use in the production of composite bodies of metal surfaces bonded to polyolefin surfaces consisting of an aqueous dispersion of an ethylene/vinyl acetate copolymer containing from 40 to 85 parts by weight of vinyl acetate and having a Mooney viscosity ML-4 of 8 to 40, from 0.5 to 5 parts by weight, based on 100 parts by weight of the copolymer, of a peroxide compound capable of crosslinking polymers and from 1 to 10 parts by weight, based on 100 parts by weight of the copolymer, of a low-molecular-weight 1,2-polybutadiene having a molecular weight of from 500 to 10,000.

With the method and composition according to the invention it is surprisingly possible to produce firm, permanent bonds between polyolefin surfaces and metal surfaces in a simple manner. It is of advantage that the adhesion assistant or binder composition can be applied in the aqueous phase, so that there are no problems regarding the recovery of the solvent (many solvents are nerve poisons) and the fire hazard of the solvent. Furthermore, the adhesion assistants or binder compositions according to the invention can be processed with higher solid contents than binder compositions based on dissolved polymers, since the viscosity of the solution increases with increasing content, while the dispersions according to the application can be easily processed even with high solid contents.

The production of the dispersions used is known from the state of the art. Mostly ethylene and vinyl acetate are polymerized in the aqueous phase in the presence of free-radical formers, particularly redox systems. The solid contents of the dispersions are generally between 30% and 60% by weight. By dilution with water, any desired solid content can be obtained, starting from concentrated dispersions. The ethylene/vinyl acetate copolymer of the dispersion should contain from 40% to 85% by weight of the solid copolymer of polymerized vinyl acetate units.

The peroxide compounds utilized are those generally used for the crosslinkage of polymers. Preferably peroxide compounds are used which disintegrate only at higher temperatures, that is, above 100° C. Examples of such peroxides are tert. butyl perbenzoate and the dialkyl peroxides with the same or different radicals, such as di-tert.-butyl peroxide, the dialkylbenzene peroxides, such as dicumyl peroxide and the alkylperesters. Preferably the peroxides are those with two peroxide groups in the molecule. Frequently the peroxide groups are attached to a tert.-butyl group. The basic moiety on which the two peroxide groups are suspended can be aliphatic, cycloaliphatic or aromatic radicals. These peroxides are, for example, the di-tert.-butyl peroxides of di-isopropyl benzene or 1,3-bis-(tert.-butyl peroxiisopropyl) benzene, 1,1-di-tert.-butyl peroxi-3,3,5-trimethyl cyclohexane, 2,5-bis-tert.-butyl peroxi-2,5-dimethylhexane, 2,5-dimethyl-2,5-(tert.-butyl peroxi)-hexine-3 and 2,2-bis-(tert.-butyl peroxi)-butane.

The peroxides can be used alone or in mixture. Frequently they are commercially available in diluted form. The amounts of 0.5 to 5 parts by weight are based on the 100 parts by weight of the solid copolymer and on 100% peroxides where a solution is employed.

As an additional component the adhesion assistant or binder composition contains low-molecular-weight 1,2-polybutadiene with a molecular weight of 500 to 10,000, preferably 1,000 to 2,000. The term polybutadiene also includes modified polybutadienes which contain small amounts of maleic acid anhydride. The term polybutadiene, therefore, includes polybutadine modified with from 0 to 15% by weight, based on the polybutadiene, of maleic acid anhydride. The preferable polybutadiene is the product "Nisso" BN 1000, Nippon Soda, Japan, a polybutadiene maleated with maleic acid anhydride, having an acid value of 110, being equivalent to a 10.9% maleation. Such polymers are commercially available. The 1,2-polybutadienes are employed in amounts of from 1 to 10 parts by weight, preferably 2 to 6 parts by weight, based on 100 parts by weight of the solid copolymer.

The origin of the polyolefins to be cemented is not critical. For example, both low-pressure and high-pressure polyethylenes, polypropylenes and polybutenes can be used. Examples of bondable metals are aluminum, iron, copper, zinc, tin, lead and their alloys.

The method according to the invention is carried out in the following manner. The copolymer dispersion which contains additives, the adhesion assistant or binder composition of the invention, is applied on the cleaned metal surfaces or the polyolefin surfaces or on both surfaces. A special preliminary treatment of the polyolefin surface is not necessary. In some cases it may be of advantage, however, if the metal surface is treated with a primer, for example, with an organic solution of a copolymer of vinyl acetate and vinyl laurate in amounts of 5 to 50 gm/m$^2$ of solid resin.

The adhesion assistant or binder composition is applied, for example, with a doctor blade, a coating roller, by brushing or by spraying. Mostly about 20 to 200 gm/m$^2$ of solids (without water) are applied to the surface. The adhesion assistant or binder composition is then dried. This can be effected, for example, by allowing the surfaces to stand in the air, by drying with hot air, or by passage through a heated zone. By compression with slight pressures of up to 10 atms. at about 140° to 200° C, a permanent bond between the metal surface and the polyolefin surface is then obtained.

The method according to the invention is used, for example, when bonding foils or plates. Such composite materials are used, for example, for packings, building facades and for sandwiched building elements.

The following specific embodiments are illustrative of the practice of the invention without being limitative in any respect.

EXAMPLE 1

Several aluminum foils were carefully cleaned with trichloroethylene and dried. Then an adhesive intermediary was applied at the rate of 100 gm of solid substance per m$^2$ consisting of:
- 250 parts of ethylene/vinyl acetate copolymer latex, 40% solids (VAE 661, Wacker Chemie, 65% by weight of vinyl acetate, Mooney viscosity 13 according to DIN 53,523),
- 3 parts of 1,1-di-tert.-butylperoxy-3,3,5-trimethoxycyclohexane ("Trigonox" 29/40),
- 3 parts of 1,2-polybutadiene with a molecular weight of about 1,000 maleated with maleic acid anhydride, having an acid value of 110 being equivalent to a 10.9% maleation ("NISSO" BN 1,000, Nippon Soda, Japan).

After drying for ½ hour, the aluminum foils were pressed together with 2 mm plates of high density polyethylene (polyethylene DF 5071 G, Wacker Chemie) for 10 minutes at 160° C. A firm bond of the aluminum foils with the polyethylene foils was obtained. The separating resistance according to DIN 53,274 was 1.75 kp/cm (force necessary to separate the foils).

EXAMPLE 2

Following the procedure described in Example 1, the following adhesive intermediary was used:
- 250 parts of ethylene/vinyl acetate copolymer latex, 40% solids (as in Example 1),
- 5 parts of 1,1-di-tert.-butylperoxy-3,3,5-trimethoxycyclohexane,
- 5 parts of 1,2-polybutadiene with a molecular weight of about 1,000.

The separating resistance was 1.9 kp/cm.

EXAMPLE 3

Aluminum foils, cleaned with trichloroethylene and dried, were coated in amounts of about 20 gm of solid resin per m² by means of a primer consisting of a 10% tetrahydrofuran solution of a vinyl acetate/vinyl laurate copolymer (50% by weight of vinyl laurate, B 17/50 VL, Wacker Chemie). These foils were joined as in Example 1 with 2 mm polyethylene plates with the same adhesive intermediary as in Example 1. The separating resistance was determined as 2.6 kp/cm.

EXAMPLE 4

Comparison

For comparison, aluminum foils cleaned with trichloroethylene and dried were coated with the following ethylene/vinyl acetate copolymer dispersions and joined with 2 mm plates of the same high density polyethylene at 160° C for 10 minutes under pressure.
- a. ethylene/vinyl acetate copolymer latex alone as in Example 1, separating resistance: 0.008 kp/cm
- b. 250 parts of ethylene/vinyl acetate copolymer latex as in Example 1,
  3 parts of 1,1-di-tert.-butylperoxy-3,3,5-trimethylcyclohexane,
  3 parts of triallyl cyanurate, separating resistance 0.030 kp/cm
- c. 250 parts of ethylene/vinyl acetate copolymer latex as in Example 1,
  3 parts of 2,5-bis-tert.-butyl peroxide-2,5-dimethylhexane,
  3 parts of triallyl cyanurate, separating resistance 0.040 kp/cm The values show that the copolymer dispersion alone cannot effect the required bonding, and that other crosslinking agents, such as triallyl cyanurate, cannot replace the effect of the polybutadiene.

The above specific embodiments are illustrative of the practice of the invention. It is to be understood, however, that other expedients known to those skilled in the art or disclosed herein may be employed without departing from the spirit of the invention or the scope of the appended claims.

We claim:

1. A method for bonding a metal surface to a polyolefin surface which comprises applying a layer of an adhesion assistant or binder composition consisting of an aqueous dispersion of an ethylene/vinyl acetate copolymer containing from 40 to 85 parts by weight of vinyl acetate and having a Mooney viscosity ML-4 of 8 to 40, from 0.5 to 5 parts by weight, based on 100 parts by weight of the copolymer, of a peroxide compound capable of crosslinking polymers, and from 1 to 10 parts by weight, based on 100 parts by weight of the copolymer, of a low-molecular-weight 1,2-polybutadiene having a molecular weight of from 500 to 10,000, to at least one of a polyolefin surface and a metal surface, allowing the aqueous dispersion to dry, placing said metal surface and said polyolefin surface in contact under pressure and an elevated temperature, and recovering a composite body of a metal surface bonded to a polyolefin surface.

2. The method of claim 1 wherein said low-molecular weight 1,2-polybutadiene has a molecular weight of from 1,000 to 2,000 and is employed in an amount of from 2 to 6 parts by weight, based on 100 parts by weight of said copolymer.

3. The method of claim 1 wherein said peroxide compound capable of crosslinking polymers contains at least two tertiary butylperoxy units per molecule.

4. The method of claim 1 wherein said metal surface is first treated with a polymeric primer.

5. The method of claim 1 wherein said low-molecular weight 1,2-polybutadiene is modified with small amounts of maleic acid anhydride.

6. An adhesion assistant or binder composition for use in the production of composite bodies of metal surfaces bonded to polyolefin surfaces consisting of an aqueous dispersion of an ethylene/vinyl acetate copolymer containing from 40 to 85 parts by weight of vinyl acetate and having a Mooney viscosity ML-4 of 8 to 40, from 0.5 to 5 parts by weight, based on 100 parts by weight of the copolymer, or a peroxide compound capable of crosslinking polymers, and from 1 to 10 parts by weight, based on 100 parts by weight of the copolymer, of a low-molecular-weight 1,2-polybutadiene having a molecular weight of from 500 to 10,000.

7. The adhesion assistant or binder composition of claim 5 wherein said low-molecular weight of 1,2-polybutadiene has a molecular weight of from 1,000 to 2,000 and is employed in an amount of from 2 to 6 parts by weight, based on 100 parts by weight of said copolymer.

8. The adhesion assistant or binder composition of claim 5 wherein said peroxide compound capable of crosslinking polymers contains at least two tertiary butylperoxy units per molecule.

9. The adhesion assistant or binder composition of claim 6 wherein said low-molecular weight 1,2-polybutadiene is modified with small amounts of maleic acid anhydride.

* * * * *

UNITED STATES PATENT OFFICE
CERTIFICATE OF CORRECTION

Patent No. 4,062,715          Dated   Dec. 13, 1977

Inventor(s) ERICH MANNER, KLAUS ADLER, ENGELBERT PICHLER, HANS SOMMER and JOHANN BAUER It is certified that error appears in the above-identified patent and that said Letters Patent are hereby corrected as shown below:

| Col. | Line | |
|------|------|---|
| 1 | 19 | "bu" should be --but-- |
| 1 | 41 | "physicl" should be --physical-- |
| 6 | 44 | "Claim 5" should be --Claim 6-- |

Signed and Sealed this

Thirtieth Day of May 1978

[SEAL]

Attest:

RUTH C. MASON
Attesting Officer

LUTRELLE F. PARKER
Acting Commissioner of Patents and Trademarks